Patented Sept. 15, 1931

1,823,704

UNITED STATES PATENT OFFICE

CARSON W. SIMMS, OF TERRE HAUTE, INDIANA, ASSIGNOR TO COMMERCIAL SOLVENTS CORPORATION, OF TERRE HAUTE, INDIANA, A CORPORATION OF MARYLAND

MANUFACTURE OF ETHERS OF DIACETONE ALCOHOL

No Drawing. Application filed June 4, 1928. Serial No. 282,890.

The present invention relates to the manufacture of the alkyl ethers of ketone alcohols, especially alkyl ethers of diacetone alcohol, and more particularly the invention relates to the conversion of mesityl oxide and methanol to methyl diacetone ether.

This methyl diacetone ether is found to be an efficient solvent for nitrocellulose, and for this reason, it has been proposed to utilize surplus stocks of acetone for the production of the aforesaid ether.

Prior investigators in this field have found that the conversion of mesityl oxide to methyl diacetone ether is a slow process, requiring upwards of ten days for the completion of the reaction, while at best, the amount of conversion is low, so that the process has been marked with a high degree of inefficiency both as to time and the production of a satisfactory yield of ether.

The present invention seeks to so modify the prior processes that the time of conversion will be very markedly reduced, and a larger yield of ether produced.

As illustrative of the prior processes, there may be mentioned the method here outlined:

A mixture of 607 grams of mesityl oxide, 561 grams of absolute ethyl alcohol and 32 grams of concentrated sulphuric acid is allowed to stand at room temperature for ten days. It is then placed in a copper still equipped with a stirrer, 35 grams of calcium hydroxide is added and the unchanged alcohol distilled off in the oil bath. It is necessary to use an excess of calcium hydroxide and to stir during the distillation because the ethyl sulphuric acid present gradually decomposes with the liberation of sulphuric acid. Finally, the ether is distilled with steam, separated, dried with calcium chloride and fractionated.

This process was found to be open to several marked difficulties:
1. Resin formation.
2. Neutralization agent too strong.
3. Formation of the mono-alkyl-sulphate in the esterification.
4. Isolation by fractional distillation.

The present process seeks to overcome these objections, as each of these difficulties has been found to be a contributing cause of the low yields and conversions noted in the process as above carried out.

The conversion of mesityl oxide and methanol to methyl diacetone ether proceeds in accordance with the reaction:

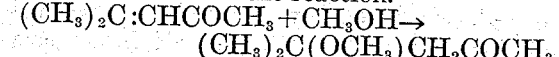

$(CH_3)_2C{:}CHCOCH_3 + CH_3OH \rightarrow$
$\qquad (CH_3)_2C(OCH_3)CH_2COCH_3$

As illustrative of the improved method forming the subject matter of the present application, the following specific illustration is given:

654 gms. of mesityl oxide are added to a mixture of 427 gms. of pure methanol and 37 gms. of solid potassium hydroxide (previously dissolved in the methanol). The mixture was then allowed to stand at room temperature for two days. Specific gravity determinations indicated that the reaction had reached equilibrium in one day. Sulphuric acid was then added until the mixture was neutral to litmus. It was then distilled under 26 inch vacuum, the temperature being maintained under 40° C. until the methanol was practically all off. Water was then added, and the material steam distilled under 26 inch vacuum. The temperature was never allowed to exceed 55° C. The yield was 273 gms. of methyl diacetone ether, boiling point 154–158° C.

It will be observed that in the present instance, caustic potash was employed as the catalyzer, instead of sulphuric acid of the prior art. The use of this caustic potash as catalyst, markedly reduced the resin formation and removed the objectionable formation of the mono-alkyl sulphate in the esterification. There was not required any isolation of the product by fractional distillation, and this step is always conducive to substantial losses.

Before the run, the mesityl oxide was purified by distillation at 45 mm. through a 20 inch fractionating column. Material boiling at 61 to 62° C. at 45 mm. was employed. It had a specific gravity of 0.854 at 25° C./4° C.

Methanol (methyl alcohol) was fractionated through a five foot column, and the material boiling between 63.7 and 63.8° C. was isolated. It had a specific gravity of 0.7965 at 15° C./15° C.

The run was repeated a number of times with similar results, the average values of which are indicated as follows:

Reaction time 3 days.

| | Per cent |
|---|---|
| Mesityl oxide converted to ether | 27.4 |
| Yield on basis of alcohol accounted for | 95.0 |
| Yield on the basis of mesityl oxide accounted for | 85.5 |
| Fraction boiling at 77–84° with respect to mesityl oxide charged | 1.1 |
| Resin with respect of mesityl oxide charged | 3.9 |

It was observed that in each case a small fraction boiling between 77 and 84° was obtained. This upon identification was shown to be methyl ethyl ketone and was in all probability formed by the decomposition of the ether as

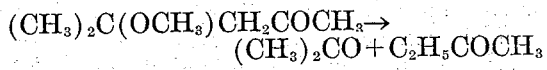
$$(CH_3)_2C(OCH_3)CH_2COCH_3 \rightarrow$$
$$(CH_3)_2CO + C_2H_5COCH_3$$

The acetone formed, since it was not detected, was probably converted to mesityl oxide, resin, or some other material. Since a reaction of this kind is so complicated, due to side reactions, it is nearly impossible to predict any definite results.

It will be observed from the results given above that this fraction is very small, and that the resin formation in the present improved process is low.

It will be understood that it is not intended to limit the procedure to the particular specific amounts of reagents set forth above, nor is it intended to limit the invention to the particular substances set forth above, as all reagents equivalent to the above specific ones are operative. Thus, in general, the series of ketone-alcohols, of which diacetone alcohol is an example, is convertible by this procedure into the corresponding ether, for example, propionyl carbinol may be thus converted with methyl alcohol; and the catalyst may also widely vary within the limits of operativeness, although those of the character described herein give the best results. Also, the methyl alcohol may be substituted by any other selected alcohol, as, for example, ethyl alcohol, propyl alcohol, isobutyl alcohol, to produce the desired ether.

To facilitate the reaction, it is found desirable to convert the ketone-alcohol into its corresponding ketone, and employ the ketone in the reaction as the water in the alcohol molecule appears to retard the conversion. For this reason, mesityl oxide, the unsaturated ketone formed by removal of water from the molecule of diacetone alcohol, is employed instead of the alcohol itself.

It is understood that it is desired to comprehend within the scope of this invention such modifications and changes as may adapt it to varying conditions and uses.

What is claimed is:

1. The process of producing methyl diacetone ether, which comprises reacting mesityl oxide and methyl alcohol in the presence of a caustic alkali catalyst.

2. The process of producing methyl diacetone ether, which comprises reacting mesityl oxide and methyl alcohol in the presence of a caustic potash catalyst, neutralizing the resulting alkaline mixture with an acid, and recovering the ether.

3. The process of producing methyl-diacetone ether, which comprises reacting mesityl oxide and methyl alcohol in the presence of a caustic potash catalyst, present in relatively small but effective amounts, until substantial equilibrium is reached.

4. The process of producing methyl diacetone ether, which comprises reacting mesityl oxide and methyl alcohol in amounts substantially in the ratio of 654 parts of the former to 427 parts of the latter, in the presence of caustic potash present in amount of substantially 37 parts, until equilibrium is reached, neutralizing the resulting mixture and recovering the ether produced in the reaction.

5. The process of producing alkyl ethers of diacetone alcohol, which comprises reacting mesityl oxide and an aliphatic alcohol in the presence of a caustic alkali catalyst.

6. In the process of producing ethers of diacetone alcohol, the steps which comprise reacting mesityl oxide and an alcohol in the presence of a caustic potash catalyst, neutralizing the resulting alkaline mixture with an acid, and recovering the ether.

7. In the process of producing alkyl ethers of diacetone alcohol, the steps which comprise reacting mesityl oxide and an aliphatic alcohol in the presence of a caustic potash catalyst, neutralizing the resulting alkaline mixture with an acid, and recovering the ether.

8. In the process of producing alkyl ethers of diacetone alcohol, the steps which comprise reacting mesityl oxide and an aliphatic alcohol in the presence of a caustic potash catalyst, present in relatively small but effective amounts, until substantial equilibrium is reached.

9. In the process of producing ethers of ketone-alcohols by the reaction of an alcohol with unsaturated ketones selected from the group consisting of mesityl oxide and homologues of mesityl oxide, the step which comprises carrying out the reaction in the presence of a caustic alkali catalyst.

In testimony whereof I affix my signature.

CARSON W. SIMMS.